United States Patent [19]

Mitchell et al.

[11] Patent Number: 4,784,543

[45] Date of Patent: Nov. 15, 1988

[54] QUICK CHANGE TOOL HOLDER

[75] Inventors: James L. Mitchell, Owasso, Okla.; Robert W. Britzke, Rogers, Ark.

[73] Assignee: Rogers Tool Works, Inc., Rogers, Ark.

[21] Appl. No.: 89,116

[22] Filed: Aug. 25, 1987

[51] Int. Cl.[4] ............................................. B23B 29/20
[52] U.S. Cl. ....................... 409/234; 82/36 R; 82/36 B; 279/91; 403/349; 409/232
[58] Field of Search ....................... 409/232–234; 82/36 R, 36 A, 36 B; 279/1 B, 89–91; 407/46, 101; 403/348, 349

[56] References Cited

U.S. PATENT DOCUMENTS

| 1,037,072 | 8/1912 | Snyder | 70/166 |
|---|---|---|---|
| 1,856,973 | 5/1932 | Smith | 279/74 |
| 2,092,060 | 9/1937 | Gairing | 279/93 |
| 2,224,386 | 12/1940 | Guild | 408/199 |
| 2,399,808 | 9/1946 | Jones | 82/36 R |
| 2,431,268 | 11/1947 | McIntyre | 285/169 |
| 2,617,166 | 11/1952 | Kaufmann | 24/221 |
| 2,885,232 | 5/1959 | Eberly | 287/53 |
| 2,953,403 | 9/1960 | Garey | 287/130 |
| 3,168,322 | 2/1965 | Dziedzic | 279/4 |
| 3,171,666 | 3/1965 | Benjamin et al. | 403/348 X |
| 3,190,377 | 6/1965 | Rassieur | 175/257 |
| 3,396,981 | 8/1968 | Hammond | 279/89 |
| 3,400,616 | 9/1968 | Mihic | 408/146 |
| 3,533,638 | 10/1970 | Sedgwick | 279/89 |
| 3,599,996 | 8/1971 | Holt | 279/1 B |
| 3,730,637 | 5/1973 | Cellini | 408/239 R |
| 3,758,125 | 9/1973 | Cornelia | 279/103 |
| 3,788,658 | 1/1974 | Benjamin et al. | 279/75 |
| 3,790,296 | 2/1974 | Mottu et al. | 408/239 R |
| 3,840,928 | 10/1974 | Beck et al. | 10/89 H |
| 3,858,910 | 1/1975 | Oetiker | 285/84 |
| 4,053,248 | 10/1977 | Schultenkamper et al. | 403/337 |
| 4,124,317 | 11/1978 | Dauth | 403/8 |
| 4,135,418 | 1/1979 | McCray et al. | 82/36 A |
| 4,228,705 | 10/1980 | Heisner | 82/36 R |
| 4,270,422 | 6/1981 | Andersson | 82/36 R |
| 4,274,314 | 6/1981 | Repinski | 82/36 R |
| 4,274,774 | 6/1981 | Haga et al. | 409/232 |
| 4,292,866 | 10/1981 | Kaczynski | 82/36 R |
| 4,325,664 | 4/1982 | Mori | 409/234 |
| 4,361,286 | 11/1982 | Hofmann et al. | 239/453 |
| 4,406,195 | 9/1983 | Kruger et al. | 82/36 B |
| 4,436,464 | 3/1984 | Seiberlich | 409/233 |
| 4,478,541 | 10/1984 | Okada et al. | 409/232 |
| 4,499,800 | 2/1985 | Stahl | 82/36 R |
| 4,585,380 | 4/1986 | Naito | 409/234 |
| 4,655,631 | 4/1987 | Mitchell | 403/349 |

FOREIGN PATENT DOCUMENTS

| 1030656 | 5/1958 | Fed. Rep. of Germany . |  |
| 2318372 | 10/1974 | Fed. Rep. of Germany . |  |
| 2752697 | 11/1976 | Fed. Rep. of Germany . |  |
| 3038674 | 5/1982 | Fed. Rep. of Germany . |  |
| 703682 | 12/1979 | U.S.S.R. | 403/348 |
| 460786 | 2/1937 | United Kingdom . |  |

OTHER PUBLICATIONS

"Block Tools: A Strong and Simple Universal System," Mach'Pro, Apr. 13, 1983.

Primary Examiner—Gil Weidenfeld
Assistant Examiner—Steven C. Bishop
Attorney, Agent, or Firm—Dickstein, Shapiro & Morin

[57] ABSTRACT

A quick change tool holder having a cutting head on which a cutting member is attached for attachment to a shank. A lockpin/locknut arrangement provides for quick and safe removal of the cutting head from the shank. The lockpin has radial projections that rotate in response to manual rotation of the lockpin in and out of recesses contained in the opening of the locknut. The lockpin is secured within a bore in the cutting head and extends out of that bore into a bore in the shank in which bore the locknut is secured. A spring and plunger combination is located in the bore of the shank in order to urge the cutting head away from the shank when the radial projections are not within the recesses of the locknut. The shank and the cutting head have corresponding mating teeth in order to prevent rotation of the cutting head relative to the shank when the cutting head and shank are attached.

26 Claims, 4 Drawing Sheets

QUICK CHANGE TOOL HOLDER

CROSS-REFERENCE TO RELATED APPLICATION

The assignee of the instant application is also the assignee of U.S. patent application Ser. No. 033,694, filed Apr. 3, 1987, entitled "QUICK CHANGE TOOL HOLDER."

BACKGROUND OF THE INVENTION

The present invention relates generally to a new and improved construction for a cutting tool holder. More particularly, the present invention relates to a quick connect/disconnect mechanism for a cutting tool head for cutting a rotating workpiece Conventional cutting tool holders consist of a shank which is attached to the cutting tool to which is attached a cutting head. The cutting tool, in operation, causes the shank and cutting head combination to move to and fro with respect to a rotating workpiece Typically, the shank is adapted to receive a wide variety of cutter heads.

With such conventional cutting tools, however, the cutting heads are typically secured to the shank by means of a bolt which passes through the cutting head and into the shank. Thus, in order to change cutting heads, it is necessary to remove the bolt, which requires a relatively great amount of time. That is especially true in light of the fact that cutting heads must be changed often thousands of times per year for each cutting machine. In addition, such operation requires the use of both hands of the operator and must be performed with care in order to prevent the accidental breakage by dropping of the cutting head.

Since cutting tool machines have been developed which no longer require an operator during operation, there is a great need for a simple and quick, yet effective, mechanism for connecting and disconnecting a cutting head from a cutting tool shank in order to return the cutting machine to operation as soon as possible.

One type of cutting tool has been suggested in which a cutter can readily be attached to and detached from the arbor head without removing the bolt typically used to secure those parts together. In U.S. Pat. No. 4,325,664, to Mori, there is shown such a system. However, in addition to the bolt, which utilizes two enlarged portions over which the cutter is fitted, two pins and two machined recesses are necessary in order to properly align the cutter to the cutting tool and to keep the cutter from rotating relative to the cutting tool. Another disadvantage is that additional time is wasted in having to secure the cutter in that manner.

In another type of cutting tool, such as that disclosed in Cellini, U.S. Pat. No. 3,730,637, the tool holder has a shank with threads on one end and the head has a threaded aperture. The threads on the head are adapted such that they mate with the threads of the shank. The threaded end of the shank is inserted into the aperture in the head and rotated in order to tighten it. Since this cutting tool holder construction utilizes threads as the means to attach the head to the shank, rotation of the head with respect to the shank may occur during operation over an extended period of time.

In still another type of cutting tool, such as that disclosed in U.S. Pat. No. 4,270,422 to Anderson, the shank is provided with a lockpin which extends from within a bore in the shank into a bore in the head. The lockpin is provided with an enlarged portion on one end which engages with a recess in the head which is shaped and sized to receive the enlarged portion. The head is held in contact with the shank by means of a spring force which acts on the enlarged portion and serves to lock that enlarged portion within the recess In such a design, movement between the head and the shank may develop over time due to wearing or warping of the enlarged portion and the recess.

Yet another approach, such as that disclosed in Haga, et al., U.S. Pat. No. 4,274,774, discloses a tool which is held to a shank by means of a bayonet end which is insertable into an aperture and rotatable to engage the aperture walls. The bayonet end has protrusions that are L-shaped such that when they are inserted part way they can only be partially rotated and, at that extent, they engage the aperture walls. The bayonet is spring loaded so that it acts as an anti-rotation device. Although, the Haga, et al. system provides some protection against rotation of the tool relative to the shank, with use over time, such design may result in the warping of the protrusions and the aperture so as to allow a certain amount of play to develop between the tool and the shank.

SUMMARY AND OBJECTS OF THE INVENTION

In view of the foregoing, it should be apparent that there still exists a need in the art for apparatus for removably attaching a cutting element or head to a shank of a rotating cutting machine in a simple, quick, and yet, effective manner. It is, therefore, a primary object of the present invention to provide apparatus which enables the quick connect/disconnect of a cutting element to the shank of a rotating cutting machine which is characterized by a simple, yet effective, mechanism and which may easily be utilized by a machine operator without fear of breakage of the cutting element.

More particularly, it is an object of the present invention to provide a simple mechanism to quickly change the head on a cutter tool that minimizes movement between the shank and the head.

Still more particularly, it is an object of the present invention to provide a simple mechanism to quickly change the head on a cutter tool which mechanism automatically accounts for wear.

Briefly described, these and other objects of the present invention are achieved by a mechanism wherein the cutting element is removably attached to a head and the head is removably attached to a shank. The shank is moved to and fro during operation to achieve the cutting of a workpiece. The cutting head and shank are removably attached to one another via a lockpin/locknut combination. The lockpin is secured in and concentric with a bore within the head and extends into a bore within the shank. One end of the lockpin has an opening accessible to an operator in which a wrench may be inserted. Rotation of the wrench produces rotation of the lockpin about the longitudinal axis of the head.

The other end of the lockpin has a bayonet end which has radial projections that are in contact with the locknut. The locknut is threaded and is secured within a threaded bore in the shank. The locknut is constructed such that it has an opening with at least one recess which is designed to receive the radial projections of the lockpin. The radial projections of the lockpin are rotated into and out of the locking position in the recess by rotating the lockpin in either a locking or an unlocking direction.

Once the projections of the lockpin are rotated into the recess in the locknut, a further rotation of the lockpin in the locking direction serves to rotate the locknut, causing it to become tightened within the threaded bore. To unlock the cutting head, the lockpin is rotated in the opposite and unlocking direction.

In order to properly and easily align the cutting head with the shank, the surface of the cutting head that engages the shank is provided with longitudinally extending teeth. In a similar manner, the surface of the shank that engages the head is provided with longitudinally extending teeth that interface with and engage the teeth of the cutting head and also serve to prevent rotation of the head with respect to the shank. Using the structure of the present invention, a cutting head on the shank of a rotating cutting machine may be changed by simple rotation of the lockpin.

DETAILED DESCRIPTION OF THE PREFERRED EMBODIMENT

Figure 1:
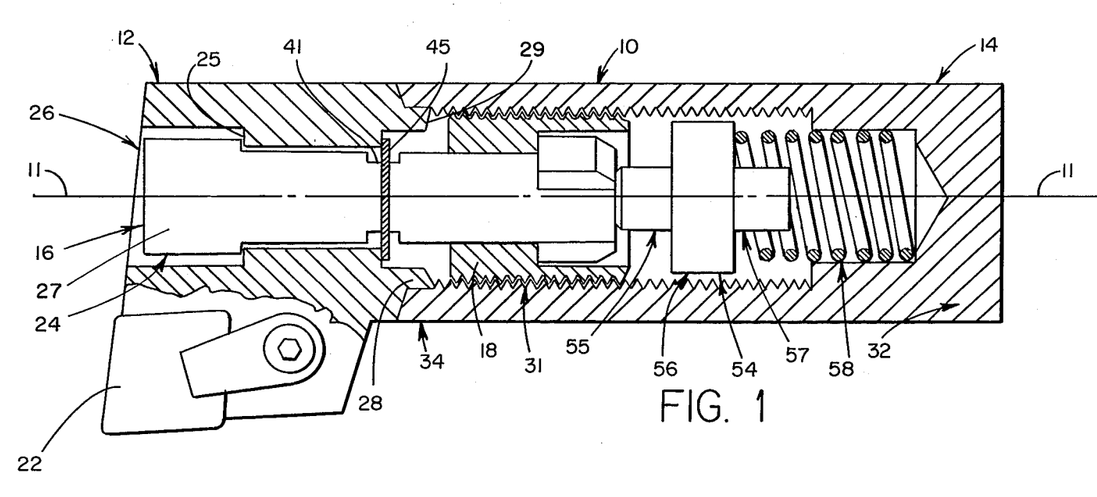
FIG. 1 is a cutaway side view of a preferred embodiment of the quick change tool holder of the present invention.

Referring now to the drawings wherein like reference numerals correspond to like parts throughout, there is shown in FIG. 1 a cutting tool assembly 10 having a cutting head 12 and a shank 4. The cutting head 12 is designed to advantageously be removably attached to the shank 14. The shank 14 is designed to be mounted to a rotating cutting machine (not shown) such that it may be moved to and fro during operation in order to achieve the cutting of a workpiece (not shown). Both the cutting head 12 and the shank 14 are constructed such that they have respective bores which are adapted to receive a lockpin 16 therein. That lockpin 16 is utilized to quickly and effectively engage with a locknut 18, located in the shank 14, in order to provide a quick connect/disconnect mechanism with which to secure the cutting head 12 to the shank 14. The cutting head 12 is locked to and unlocked from the shank 14 by means of rotating the lockpin 16 into and out of its locked position.

More particularly, the cutting head 12 may be of any suitable shape. As previously described, the cutting head 12 is constructed with a bore 24 located therein. That bore 24 is sized and shaped to receive the lockpin 16 therein and is coextensive with a longitudinal axis 11 of the lockpin 16. The cutting head 12 has a front end 26 and a rear end 28. Attached to the front end 26 of the cutting head 12 is a cutting insert 22, which may be of any desired shape. The rear end 28 of the cutting head 12 is constructed with a machined interface surface 29. Such interface 29 is preferably a toothed surface, such as that depicted in FIG. 2, having a plurality of teeth 30 that extend in a longitudinal direction of the cutting head 12. In addition, an alignment tooth 37, which is of a different shape than the other teeth 30, is also provided on interface surface 29 in order to provide for the ready alignment of the cutting head 12 with the shank 14.

Figure 2:
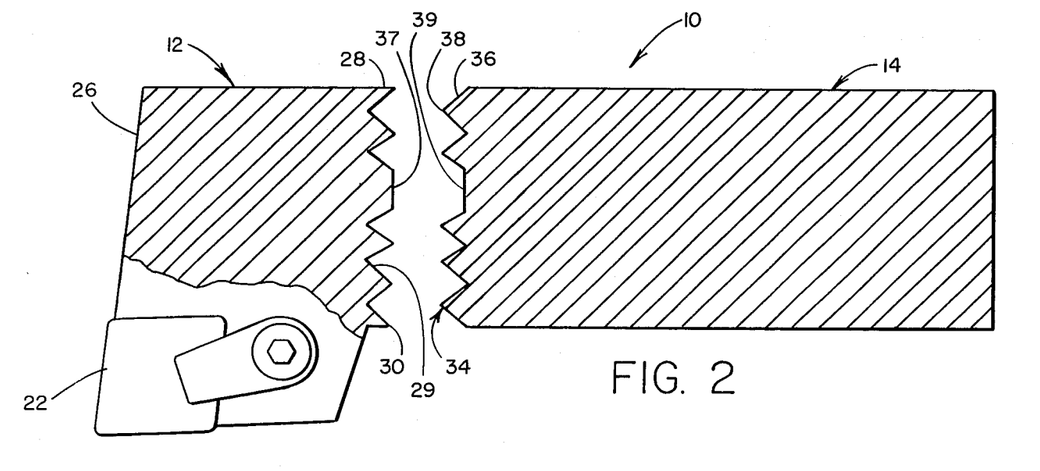
FIG. 2 is a less detailed exploded side view of the quick change tool holder of FIG. 1.

The shank 14 may be of any suitable shape. In the embodiment as shown in FIG. 1, the shank 14 is constructed as a substantially rectangular piece and is adapted to be connected to a cutting tool machine. The shank 14 has a bore 31 which extends along its longitudinal axis. In the embodiment shown in FIG. 1, that bore 31 is cylindrical and has threads threaded over a portion of its length. The shank 14 is constructed with a rear end 32 which is adapted to be attached to a cutting machine, and a front end 34 which is adapted to e attached to a rear end 28 of the cutting head 12. The front end 34 of the shank 14, as depicted in FIG. 2, has an interface surface 36 which is machined therein. That interface 36 is constructed as a toothed surface having a plurality of teeth 38 which are adapted to engage the teeth 30 of the interface surface 29 of the cutting head 12. The interface 36 of the shank 14 is also provided with an alignment groove 39, which is sized and shaped to mate with the alignment tooth 37 of interface surface 29 of the cutting head 12. The engagement of the teeth 30 of the cutting head 12 and the teeth 38 of the shank 14, serve to prevent the cutting head 12 from rotating with respect to the shank 14. The engagement of the alignment groove 39 with the alignment tooth 37 provides for a quick and exact alignment of the cutting head 12 with respect to the shank 14.

Figure 3A:
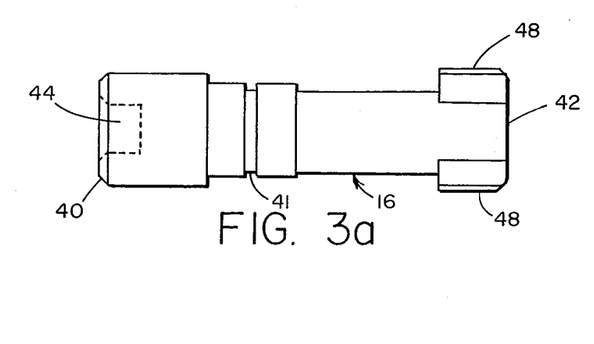
FIG. 3a is a side view of the lockpin of the quick change tool holder of FIG. 1
Figure 3B:
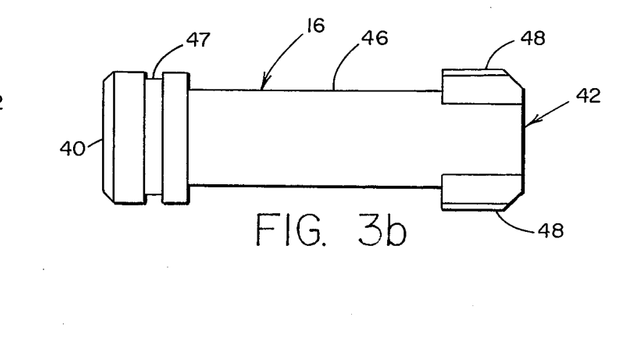
FIG. 3b is a side view of the lockpin of the quick change tool holder of FIG. 6.
Figure 4A:
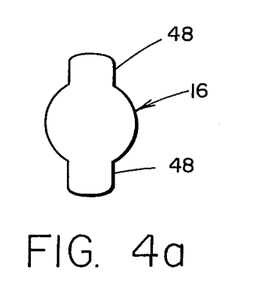
FIG. 4a is an end view of the rear end of the lockpin of FIG. 3
Figure 4B:
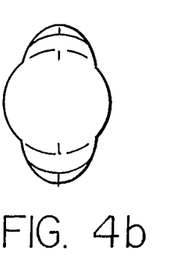
FIG. 4b is an end view of the rear end of an alternative lockpin structure.
Figure 5:
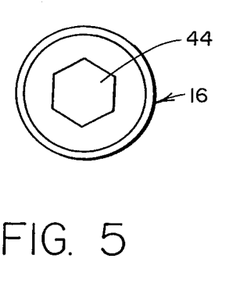
FIG. 5 is an end view of the front end of the lockpin of FIG. 3.

Turning now to FIGS. 3, 4 and 5, there is shown the lockpin 16 which has a cylindrical body portion 46 with a front end 40 and a rear end 42. The rear end 42 is preferably configured as bayonet shaped with at least two radial projections 48. An opening 44 is disposed in front end 40 and is adapted to receive a wrench or other tool (not shown) used to rotate the lockpin 16. In a preferred embodiment, the opening 44 has a non-circular hexagonal operating portion. Rotation of the wrench after its insertion into the opening 44 by an operator serves to rotate the lockpin 16.

Figure 6:
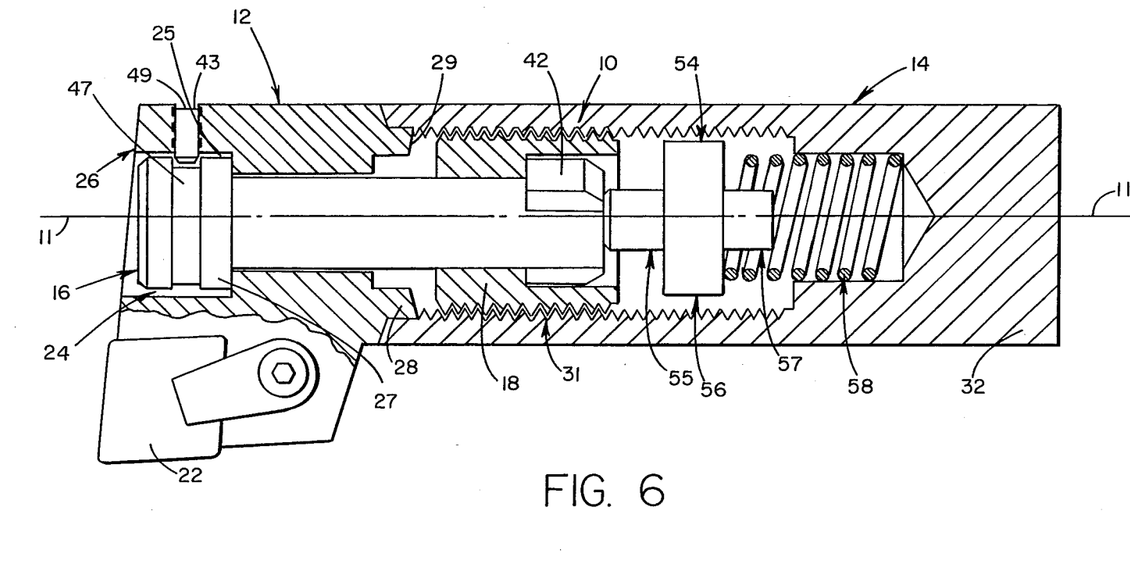
FIG. 6 is a cutaway side view of an alternative embodiment of the quick change tool holder of the present invention.
Figure 7:
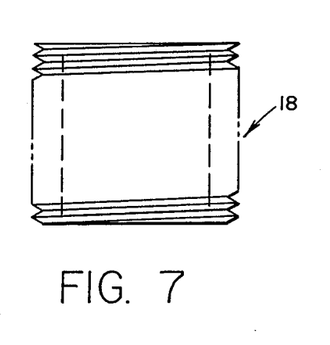
FIG. 7 is a side view of the locknut of the quick change tool holder of FIG. 1.
Figure 8:
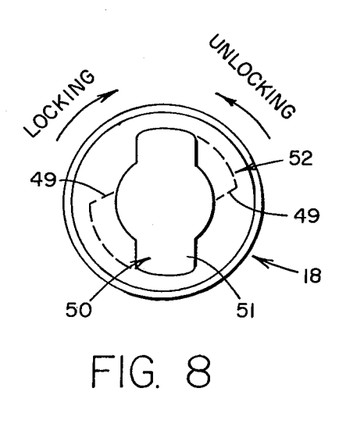
FIG. 8 is an end view of the first section end of the locknut of FIG. 7.
Figure 9:
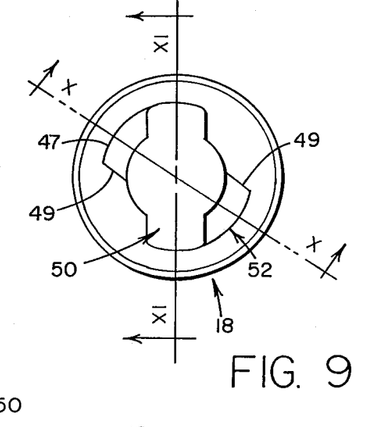
FIG. 9 is an end view of the second section end of the locknut of FIG. 7.
Figure 10:
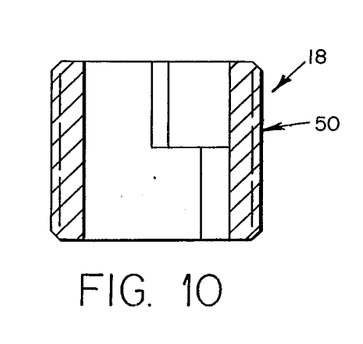
FIG. 10 is an end view taken along the section line X—X of FIG. 9.
Figure 11:
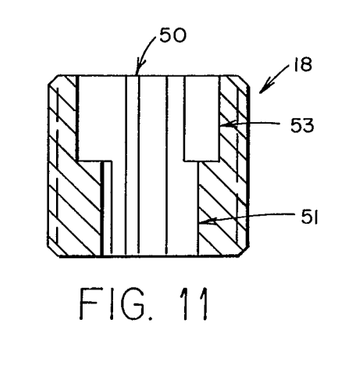
FIG. 11 is an end view taken along the section line XI—XI of FIG. 9.

The lockpin 16 extends through bore 24 in the cutting head 12 and may be attached to the cutting head 12 by any suitable means. In the embodiment shown in FIG. 1, a circular groove 41 is constructed in the lockpin 16 near the middle of the lockpin 16. A clamp 45 is disposed in the shank 14 such that it secures the lockpin 16 by means of fitting into the groove 41. In an alternative embodiment as shown in FIG. 6, a circular groove 47 surrounds the front end 40 of the lockpin 16 and a pin 43 is disposed in a bore 39 within the cutting head 12 perpendicular to the longitudinal axis of the cutting head 12 in order to secure the lockpin 16 in the bore 24 in a like manner. The pin 43 extends into the bore 24 and is positioned in the groove 87, thereby securing the lockpin 16 to the cutting head 12.

In both embodiments, the lockpin 16 has a head portion 27 which abuts a shoulder 25 in the bore 24, thereby holding the head portion 27 of the lockpin 16 against further axial movement through the bore 24 in the direction of the shank 14. As described below in greater detail, as the lockpin 16 is urged into the bore 31 of the shank 14, the head portion 27 bears against the shoulder 25 in order to tighten the cutting head 12 to the shank 14.

The lockpin 16 is disposed in the bore 24 and extends along the length of the bore 24 so that the front end 40 of the lockpin 16 is nearly flush with the front end 26 of the cutting head 12. The lockpin 16 extends out of the bore 24 so that the radial projections 48 are not located within the bore 24.

A locknut 18, as depicted in FIGS. 1 and 7 through 11, is disposed in the bore 31 of the shank 14. The locknut 18 is externally threaded so that it may be screwed into the bore 31. In addition, the locknut 18 is provided with an aperture 50 which extends axially through its center. The aperture 50 has a first section 51 which is sized and shaped to receive the body as well as the radial projections 48 of the lockpin 16. A second section 53 is provided in the aperture 50 which is shaped like the first section 51 and additionally includes first and second recesses 52 formed in the inside of the locknut 18 in order to receive the radial projections 48 upon rotation of the lockpin 16. Each of the recesses 52 has a wall 47 which is in the shape of a partial cylinder concentric with aperture 50 as well as a wall 49 which forms a boundary to the recesses 52. The lockpin 16 is inserted into the aperture 50 and pushed in until the radial projections 48 are in the second section 53. The lockpin 16 is then rotated in a locking direction until the radial projections 48 abuts the wall 47. Further rotation of the lockpin 16 serves to cause the locknut 18 to rotate in a locking direction by the action of the radial projections 48 on the wall 47.

As depicted in FIG. 1, a plunger 54 is disposed within the bore 31 of the shank 14. The plunger 54 has a first axial section 55, a second axial section 56 and a third axial section 57. The diameter of the first axial section 55 is less than the diameter of the second axial section 56. The diameter of the third section 57 is also less than the diameter of the second axial section 56. The axial section 55 is in contact with the rear end 42 of the lockpin 16. A spring 58 contacts the second axial section 56 such that the third axial section 57 is located within the spring 58. The spring 58 biases the plunger 54 which urges the lockpin 16 away from the locknut 18 when the lockpin 16 and the locknut 18 are unlocked or when the lockpin 16 fails to properly engage the locknut 18 upon insertion after a change of the cutting head 12. It thus serves as a safety feature.

In operation, when it is desired to change the cutting head 12, a turning tool or wrench is inserted into the opening 44 of the lockpin 16 and the lockpin 16 is rotated in an unlocking direction. Upon rotation, the radial projections 48 on the lockpin 16 are rotated out of the recesses 52. The plunger 54, being biased by the spring 58, urges the lockpin 16 away from the locknut 18 and the cutting head 12 is removed. In order to secure a new cutting head 12 on to the shank 14, the interface surface 29 of a new cutting head 12 is positioned such that the teeth 30 of the cutting head 12 engage the teeth 38 of the shank 14 and the alignment tooth 37 of the cutting head 12 engages the alignment groove 39 in the shank 14. The entire cutting head 12 is then urged towards the shank 14 in order to overcome the force of the spring 58. A tool or wrench is then inserted into the opening 44 on the lockpin 16 and the lockpin 16 is rotated in a locking direction. Upon rotation of the lockpin 16, the radial projections 48 on the lockpin 16 are positioned in the recesses 52 on the locknut 18. The lockpin 16 is then further rotated in a locking direction, thus causing the locknut 18 to be turned by the radial projections 48. By such rotation, the locknut 18 is tightened into the bore 31 and the cutting head 12 is quickly, yet securely and safely, locked onto the shank 14.

Although only a preferred embodiment is specifically illustrated and described herein, it will be appreciated that many modifications and variations of the present invention are possible in light of the above teachings and within the purview of the appended claims without departing from the spirit an intended scope of the invention.

What is claimed:

1. Apparatus for releasably connecting a cutting tool head to a shank, comprising:
    a cutting tool head having a front end, a rear end and a bore therethrough, said rear end having an interface surface; face;
    a shank having a front end, a rear end and a bore therein, said forward end having an interface surface adapted to engage said interface surface of said cutting tool head so as to hold said cutting tool head against rotation relative to said shank;
    lockpin means disposed for rotation within the bore of said cutting tool head, said lockpin means extending longitudinally out of said cutting tool head and into the bore of said shank, said lockpin means having a front end and a rear end, said front end being secured to said cutting tool head; and
    locknut means having a front end and a rear end and being adapted to fit moveably and securely within said bore of said shank, said locknut means having an aperture therein disposed to receive the rear end of said lockpin means, said locknut means having a locking and unlocking means for locking said lockpin means in said locknut means in response to rotation of said lockpin means in a first locking direction and for unlocking said lockpin means from locknut means in response to rotation of said lockpin means in a second and opposite unlocking direction.

2. The apparatus of claim 1, wherein:
    said lockpin means comprises a pin having an opening at the front end thereof and at least one radial projection on its rear end and said locknut means has a hole therein sized and shaped to receive said at least one radial projection; and
    said locking and unlocking means comprises a recess within the aperture of said locknut means, said recess being formed in the sides of said aperture and being shaped to receive said at least one radial projection of said lockpin means when said lockpin means is rotated in said first locking direction and for releasing said at least one radial projection of said lockpin means when said lockpin means is rotted in said second and unlocking direction, said recess being formed so that upon receipt of said at least one radial projection, further rotation in said first locking direction tightens said locknut means in said bore of said shank.

3. The apparatus of claim 1, wherein said cutting tool head includes a cutting member attached thereto.

4. The apparatus of claim 1, further including threads within the bore of said shank and engaging threads on said locknut means such that said locknut means is tightened in said bore by the engagement of the threads in the bore with the threads on the locknut means in response to rotation of said locknut means.

5. The apparatus of claim 1, wherein said interface surface of said cutting tool head and said interface surface of said shank comprise a plurality of teeth, said teeth on the interface surface of said cutting tool head facing and engaging the teeth on the interface surface of said shank.

6. The apparatus of claim 1, wherein said aperture within said locknut means is shaped and sized to receive at least one radial projection on said rear end of said lockpin means.

7. The apparatus of claim 5, wherein said interface surface on said cutting tool head further comprises an alignment tooth and said interface surface on said shank further comprises an alignment groove sized and shaped to securely receive said alignment tooth therein.

8. The apparatus of claim 1, further comprising:
a plunger having first, second and third axial sections, said first section having a diameter and said second section having a diameter greater than the diameter of said first section and said third section having a diameter approximately equal to the diameter of said first section, said first section contacting said locknut means and said second and third sections positioned within said bore of said shank at the rear end of said shank; and
spring means biasing said second section of said plunger.

9. A tool with a quick change cutting tool head mechanism, comprising:
shank means mounted to said tool and having a bore therein;
cutting head means having a bore therein and adapted to be removably attached to said shank means;
pin means having front and rear ends, said front end being connected to and within said bore in said cutting head means and said rear end having at least one radial projection thereon;
locknut means threaded within said shank means having at least one recess disposed to receive therein said at least one radial projection on said pin means in response to rotation of said pin means in a locking direction, said recess being disposed so that further rotation of said pin means once said at least one radial projection is lockingly received within said at least one recess tightens said locknut means within said shank means; and
means disposed in said shank means for locking and unlocking said pin means within said locknut means in response to rotation of said pin means.

10. The tool of claim 9, further comprising means disposed in said shank means for urging said pin means away from said locknut means when said pin means is unlocked from said locknut means.

11. The tool of claim 9, wherein said locking and unlocking means comprises a recess within said locknut means disposed to receive at least one radial projection of said pin means, said at least one radial projection being rotated in and out of said recess in response to rotation of said pin means.

12. The tool of claim 10, wherein said means for urging includes:
plunger means located in said bore of said shank means and having first, second and third axial sections, said first and third sections having approximately equal diameters and said second section having a diameter greater than the diameter of said first and third sections, said first section contacting said locknut means; and
spring means located within said shank means in communication with said second section of said plunger means so that when said cutting head means is in an unlocked relationship with said shank means said spring means, communicating through said plunger means, urges said cutting head means away from said shank means.

13. The tool of claim 9, wherein said bore in said cutting means is aligned with said bore in said shank means so that said pin means extends out of the bore in said cutting head means and into the bore in said shank means and engages said locknut means.

14. The tool of claim 9, wherein said cutting head means has an interface surface and said shank means has a corresponding interface surface, said interface surface of said shank means being adapted to receive the interface surface of said cutting head means so as to prevent movement of said cutting head means with respect to said shank means.

15. The tool of claim 9, wherein said bore in said shank means is threaded and said locknut means is threaded so that said locknut is threaded into said bore.

16. The tool of claim 9, wherein said tool is a cutting tool and a cutting means is attached to said cutting head means.

17. Apparatus for quickly latching and unlatching a cutting tool head from a shank, comprising
lockpin means having front and rear ends, said front end being connected to and disposed for rotation in said cutting tool head and said rear end having a bayonet end with at least one radial projection;
locknut means disposed in said shank and having an aperture sized and shaped to receive said bayonet end of said lockpin means therein;
locking means in said locknut means for locking said at least one radial projection in said locknut means in response to rotation of said lockpin means; and
biasing means for urging said lockpin means away from said locknut means when said cutting tool head and said shank are in an unlatched relationship.

18. The apparatus of claim 17, wherein said locking means includes a recess in said locknut means for receiving said at least one radial projection of said bayonet end of said lockpin means in a locking and unlocking relationship in response to rotation of said lockpin means.

19. The apparatus of claim 17, wherein said biasing means comprises:
plunger means having first, second and third axial sections, wherein the diameter of said first and third sections is less than the diameter of said second section and approximately equal to the diameter of said third section, said first section being in contact with said locknut means; and
spring means operatively abutting said second section of said plunger means.

20. The apparatus of claim 17, wherein said lockpin means further includes an aperture in said front end for receiving a wrench means for rotating said pin means.

21. The apparatus of claim 17, further comprising movement prevention means to prevent rotational movement of said cutting tool head with respect to said shank.

22. The apparatus of claim 21, wherein said movement prevention means comprises:
   an interface surface on said cutting tool head; and
   an interface surface on said shank adapted to engage the interface surface on said cutting tool head.

23. The apparatus of claim 22, wherein said interface surface of said cutting tool head comprises a plurality of teeth and said interface surface on said shank comprises a plurality of teeth, said teeth on said cutting tool head being adapted to engage said teeth on said shank.

24. The apparatus of claim 23, wherein said interface surface on said cutting tool head further comprises an alignment tooth and said interface surface on said shank further comprises an alignment groove sized and shaped to receive said alignment tooth securely therein.

25. The apparatus of claim 17, further including means for removably securing said pin means within said bore of said cutting tool head.

26. The apparatus of claim 25, wherein said means for removably securing said lockpin means comprises:
   a circumferential groove in said lockpin means; and
   means secured in said cutting tool head for engaging said lockpin means.

* * * * *

UNITED STATES PATENT AND TRADEMARK OFFICE
CERTIFICATE OF CORRECTION

PATENT NO. : 4,784,543

DATED : November 15, 1988

INVENTOR(S) : James L. Mitchell and Robert W. Britzke

It is certified that error appears in the above-identified patent and that said Letters Patent is hereby corrected as shown below:

Column 1, line 21, after "workpiece" insert --.--.

Column 2, line 6, after "recess" insert --.--.

Column 3, line 55, change "4" to --14--.

Column 4, line 30, change "e" to --be--.

Column 6, line 22, change "an" to --and--; line 29, delete "face;"; and line 67, change "rotted" to --rotated--.

Column 8, line 38, after "comprising" insert --:--.

Signed and Sealed this

Twenty-sixth Day of November, 1991

Attest:

HARRY F. MANBECK, JR.

*Attesting Officer*  *Commissioner of Patents and Trademarks*